United States Patent [19]

Miyamoto et al.

[11] Patent Number: 5,598,246
[45] Date of Patent: Jan. 28, 1997

[54] CAMERA CAPABLE OF REDUCING IMAGE BLUR

[75] Inventors: Hidenori Miyamoto, Urayasu; Tatsuo Amanuma, Ageo; Toshiyuki Nakamura, Tokyo, all of Japan

[73] Assignee: Nikon Corporation, Tokyo, Japan

[21] Appl. No.: 570,823

[22] Filed: Dec. 12, 1995

Related U.S. Application Data

[63] Continuation of Ser. No. 358,620, Dec. 14, 1994, abandoned.

[30] Foreign Application Priority Data

Dec. 15, 1993 [JP] Japan .................................. 5-315148
Dec. 15, 1993 [JP] Japan .................................. 5-315149
Dec. 15, 1993 [JP] Japan .................................. 5-315150

[51] Int. Cl.[6] .............................. G03B 5/00; G03B 15/03
[52] U.S. Cl. ............................................ 396/55; 396/158
[58] Field of Search ..................... 354/430, 202, 354/400, 415

[56] References Cited

U.S. PATENT DOCUMENTS

| | | | |
|---|---|---|---|
| 4,965,619 | 10/1990 | Shikaumi et al. | 354/430 X |
| 4,970,540 | 11/1990 | Vasey | 354/202 |
| 5,084,724 | 1/1992 | Maeno | 354/430 |
| 5,210,563 | 5/1993 | Hamada et al. | 354/400 |
| 5,233,374 | 8/1993 | Kanai et al. | 354/400 |

*Primary Examiner*—W. B. Perkey
*Attorney, Agent, or Firm*—Oliff & Berridge

[57] ABSTRACT

A camera capable of reducing image blur according to the present invention comprises a vibration detection device that detects the quantity of camera vibration, an image blur reducing device that, based upon the detection output from the vibration detection device, electrically drives an image blur reducing optical system in a direction different from the direction of the optical axis in order to reduce blurring of the photographic image, a flash photographing device that, when flash photographing conditions are present, performs photographing by emitting an illuminating light to illuminate the photographic subject, a pre-light emission device that, prior to flash photographing, performs pre-light emission in order to reduce the red eye phenomenon and a control device that, when flash photographing conditions are present, causes the image blur reducing device and the flash photographing device to operate after the pre-light emission by the pre-light emission device is completed.

35 Claims, 13 Drawing Sheets

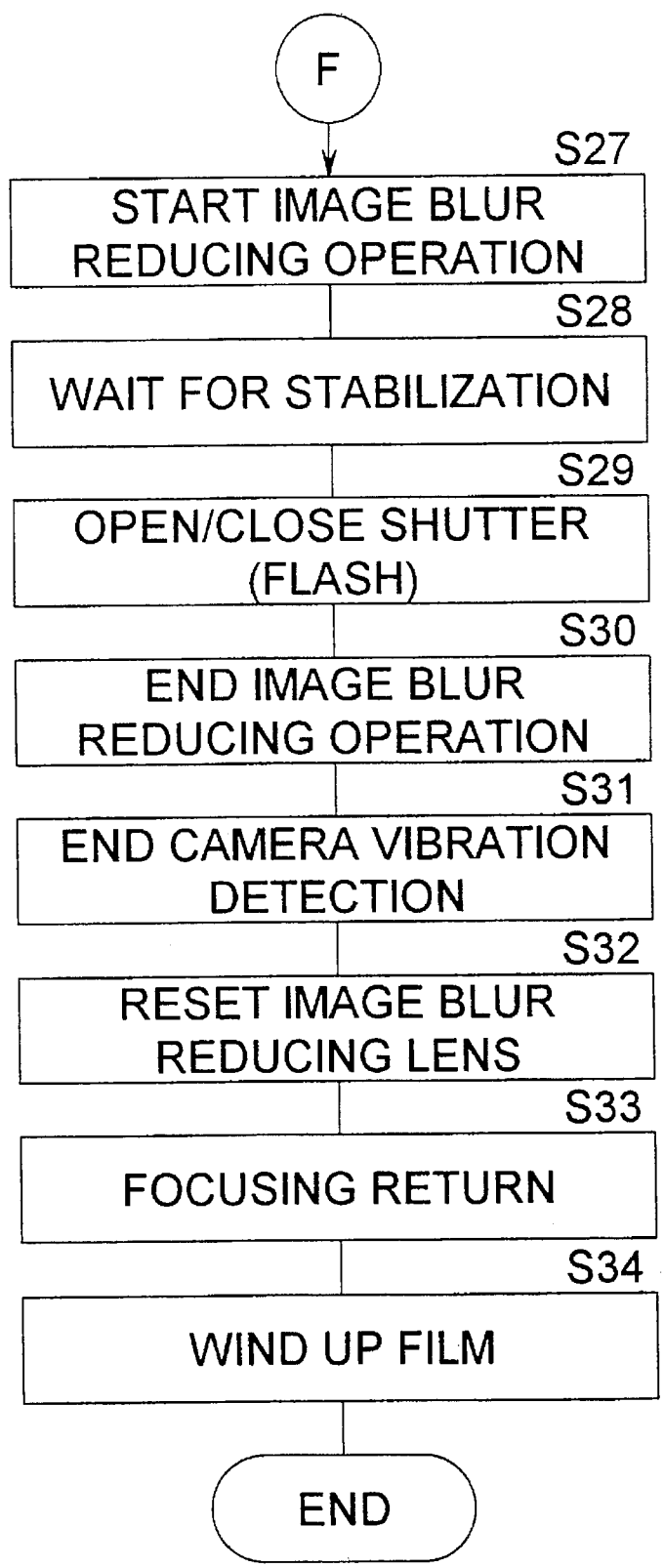

CAMERA CAPABLE OF REDUCING IMAGE BLUR

This is a Continuation of application Ser. No. 08/358,620 filed Dec. 14, 1994, now abandoned.

BACKGROUND OF THE INVENTION

1. Field of the Invention

The present invention relates to a camera which is capable of reducing image blur by shifting the image blur reducing optical system in a direction that is different from the direction of the optical axis of the photographic lens to prevent image blur caused by vibration of the camera.

2. Description of the Related Art

In the known art, there are cameras capable of reducing image blur that are provided with a camera vibration sensor (an angular acceleration sensor, for instance) which detects the quantity of camera vibration caused by hand movement and the like, and an image blur reducing mechanism that electrically drives the image blur reducing optical system, which constitutes the photographic lens, in a direction perpendicular to the optical axis, based upon the detection output from the camera vibration sensor. Normally, with these cameras, when the release button is pressed halfway down, camera vibration detection performed by the camera vibration sensor starts, and the image blur reducing mechanism is operated when the release button is pressed all the way down for photographing. With the operation of the image blur reducing mechanism, the blurring of the photographic image (image blur) caused by vibration of the camera, is reduced.

Also known in the prior art is a camera that is provided with red-eye reducing function. In this type of camera, by pressing the release button all the way down, light emission of a red-eye reducing lamp (pre-light emission), for instance, is started and then flash photographing using an electronic flash device is performed after a specific length of time elapses. With such a camera, flash photographing is performed when the pupils of the photographic subject (person) who is looking at the pre-light emission are contracted, and as a result, the red eyes phenomenon is less conspicuous in the photograph.

Now, when a camera that is capable of reducing image blur as described above is also provided with a red eye reducing function, generally, the operation of the image blur reducing mechanism and pre-light emission for red eye reduction are performed simultaneously, by pressing the release button all the way down. However, in such a case, the problem arises that a fluctuation in the voltage supplied to the drive source (motors) of the image blur reducing mechanism is caused by the elevated current generated during the pre-light emission, and this prevents accurate image blur reduction.

SUMMARY OF THE INVENTION

The object of the present invention is to provide a camera that is capable of reducing image blur without having the image blur reducing operation of the image blur reducing mechanism adversely affected by the pre-light emission for red eye reduction.

In order to achieve the object described above, the camera capable of reducing image blur according to the present invention is provided with a vibration detection device that detects the quantity of camera vibration, an image blur reducing device that, based upon the detection output from the vibration detection device, electrically drives an image blur reducing optical system in a direction that is different from the direction of the optical axis of the photographic lens in order to reduce blurring of the photographic image, a flash photographing device which performs photographing with emitting an illuminating light to illuminate the photographic subject when the flash photographing condition is present, a pre-light emission device that performs pre-light emission prior to flash photographing in order to curtail the red eye phenomenon, and a control device that, when the flash photographing condition is present, causes the image blur reducing device and the flash photographing device to operate after the pre-light emission by the pre-light emission device is completed.

According to the present invention, when the flash photographing condition is present, pre-light emission for red eye reduction is performed and when the pre-light emission is finished, the image blur reducing operation and flash photographing are performed. This means that the pre-light emission and the image blur reducing operation are not performed simultaneously and it becomes possible to perform image blur reduction accurately by preventing fluctuation of the voltage supplied to the drive source of the image blur reducing mechanism that would be caused by the elevated current at the time of pre-light emission.

BRIEF DESCRIPTION OF THE DRAWINGS

FIGS. 7A and 7B are a flow chart showing the photographing procedure in the third embodiment;

DETAILED DESCRIPTION OF THE PREFERRED EMBODIMENTS

The first through third embodiments according to the present invention are explained in reference to the drawings.

First, the structure which is common to those embodiments is explained below.

Figure 1:
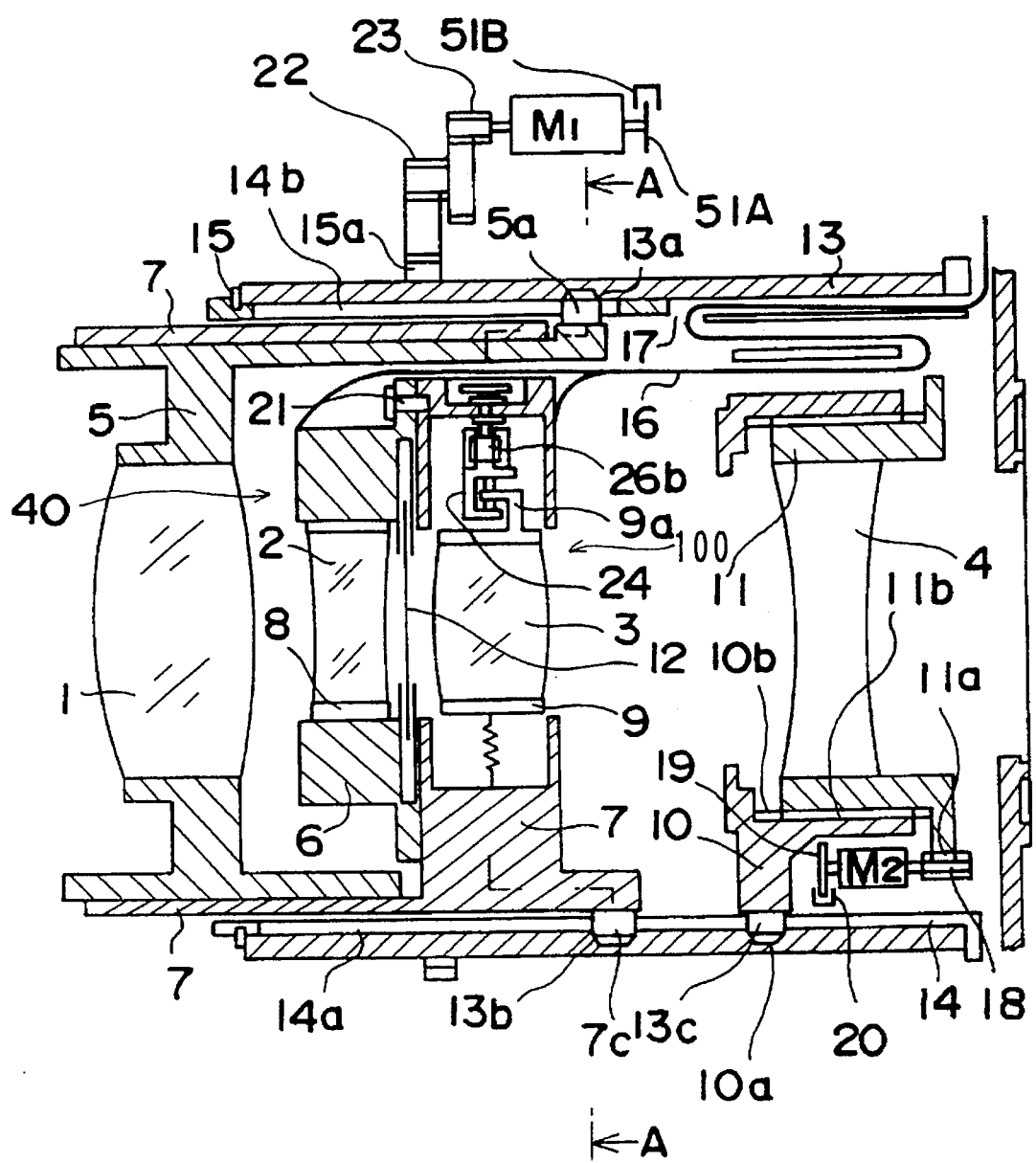
FIG. 1 shows the internal structure of the lens barrel of a camera in embodiments of the camera capable of reducing image blur according to the present invention.

FIG. 1 shows the structure of the essential parts of the camera that is capable of reducing image blur according to the present invention;

Reference number 14 indicates a fixed barrel secured to the camera main body 1 and rectilinear grooves 14a, 14b are formed in the direction of the optical axis on the circumferential surface of the fixed barrel 14. The cam cylinder 13 is provided on the external circumferential surface of the fixed barrel 14 in such a manner that it can rotate, and the ring 15 prevents the cam cylinder 13 from coming off. The rotation of the zoom motor M1 is communicated to the gear unit 15a, which is formed on the external circumferential surface of the cam cylinder 13, via the gear 22,23 and this rotates the cam cylinder 13. The cam grooves 13a, 13b and 13c are formed on the circumferential surface of the cam cylinder 13. Reference number 51A indicates a slit disk which rotates in unison with the zoom motor M1 and reference number 51B indicates a photo interrupter that detects the rotating quantity of the slit disk 51A, i.e., the rotating quantity of the zoom motor M1.

Figure 2:
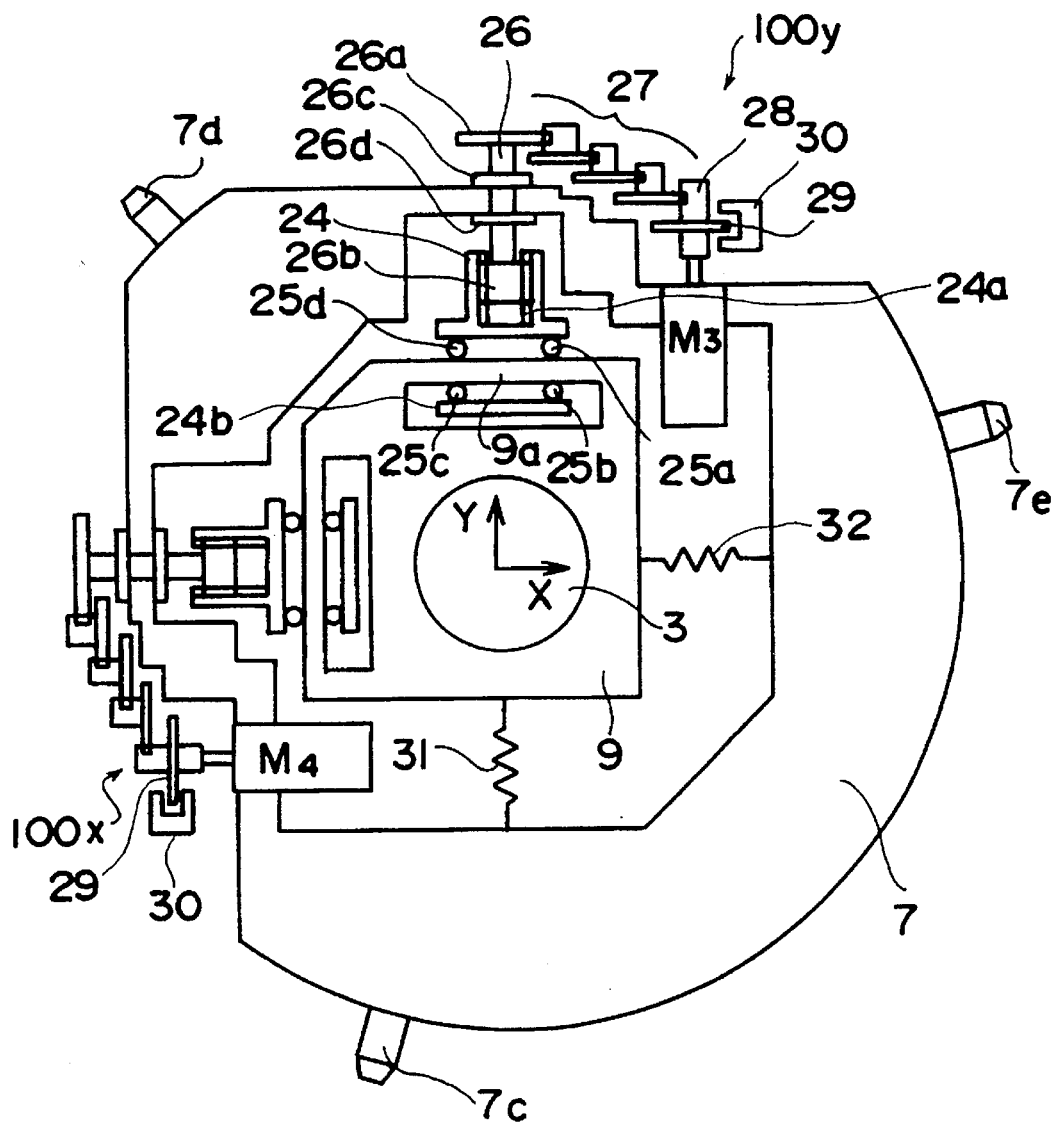
FIG. 2 is a cross section through the line A—A of the lens barrel in FIG. 1.

The lens base 7 is inserted on the side of the internal circumferential surface of the fixed barrel 14 and the image blur reducing device 100 is held in the lens base 7. The image blur reducing device 100 comprises the image blur reducing lens 3 for reducing the blur of the photographic image caused by camera vibration, which is held by the lens holder 9 and the drive mechanism which drives the image blur reducing lens 3. The drive mechanism consists of, as shown in FIG. 2, the X direction drive mechanism 100x which drives the image blur reducing lens 3 in direction X and the Y direction drive mechanism 100y which drives it in direction Y. Directions X and Y are both at a right angle to the optical axis of the photographic lens.

The Y direction drive mechanism 100y is provided with the Y direction motor M3, the gear 28 which rotates in unison with the output shaft of the motor M3, the speed reducing gear train 27 which reduces the rotation speed imparted by the gear 28, the Y direction shift drive shaft 26 which is linked with the gear train 27 and the Y direction drive arm 24 which converts the rotation of the drive shaft 26 into linear movement. The Y direction shift drive shaft 26 is supported by the base 7 with a pair of flanges 26c,26d in such a manner that it can rotate. The gear 26c, which interlocks with the last gear of the speed reducing gear train 27, is fitted on the upper portion of the Y direction shift drive shaft 26, and a male threaded portion 26d is formed at the lower portion of the Y direction shift drive shaft 26. The Y direction drive arm 24 is held in the space which is formed in the base 7 in such a manner that it can be lowered and elevated and, at the same time, it cannot rotate. The male threaded portion 26b of the drive shaft 26 is fitted into the female threaded portion 24a that is formed at the upper portion of the drive arm 24.

A clamping member 24b is formed at the lower end of the drive arm 24 and the upper linking portion of the lens holder 9 is clamped by the clamping member 24b via the four slider balls 25a–25d. As a result, when the drive arm 24 is raised or lowered, the lens holder 9 and, therefore, the image blur reducing lens 3 are shifted in direction Y in the figure. The shift quantity is determined by the quantity of rotation of the motor M3. The X direction drive mechanism 100x has an identical structure to that of the Y direction drive mechanism 100y, in which the image blur reducing lens 3 shifts in direction X.

A disk 29, in which a plurality of holes are punched radially, is mounted to the gear 28, which rotates in unison with the output shaft of the Y direction motor M3, in such a manner that it also rotates in unison. Reference number 30 indicates a photo interrupter of the known art, which is provided with a light source portion and a light sensing portion which face each other across the area of the disk 29 in which the holes are formed so that every time the photo interrupter 30 detects a hole in the disk 29, a pulse signal is output. By counting the number of pulses, the rotation rate of the motor (determined by the shift quantity of the image blur reducing lens 3) is detected. An identical set of disk and photo interrupter is provided on the X direction motor side, and with these, the rotation rate of the motor is detected.

Reference number 31, 32 in FIG. 2 indicates springs which apply a force to the lens holder 9 toward the Y direction drive mechanism 100y and toward the X direction drive mechanism 100x.

In FIG. 1, a lens shutter mechanism 40 is mounted as an integrated part of the image blur reducing device 100 as described above. The lens shutter mechanism 40 is constituted by integrating a shutter blade 12, which also functions as an aperture, and the drive unit 6, which drives the shutter blade 12. The drive unit 6 is mounted onto the base 7 with the screw 21. A lens group 2 is held via a lens holder 8 on the internal circumferential surface of the drive unit 6. The cam follower 7c, which projects out from the base 7, is connected with the cam groove 13b of the cam cylinder 13 by passing through the rectilinear groove 14a of the fixed barrel 14. The lens holder 5, which holds the lens group 1, is inserted on the front end of the fixed barrel 14 and the cam follower 5a, which projects out from the external circumferential surface of the lens holder 5, is connected with the cam groove 13a of the cam cylinder 13 by passing through the rectilinear groove 14a of the fixed barrel 14.

The lens base 10 is inserted at the rear end of the fixed barrel 14. The helicoid 10b is formed on the internal circumferential surface of the lens base 10 and the cam follower 10a projects out from the external circumferential surface of the lens base 10. The cam follower 10a is connected with the cam groove 13c of the cam cylinder 13 by passing through the rectilinear groove 14b of the fixed barrel 14. Reference number 11 indicates a lens holder that holds the focusing lens 4. The helicoid 11b, which is formed on the external circumferential surface of the lens holder 11, is fitted by threading with the helicoid 10b in the lens base 10.

In addition, the gear 18, which is integrated as a unit with the output shaft of the focusing motor M2 is fitted into the gear portion 11a which is provided in the lens holding frame 11. As the motor M2 rotates, the lens holder 11 also rotates. Reference number 19 indicates a slit disk which rotates in unison with focusing motor M2 and reference number 20 indicates a photo interrupter that detects the rotating quantity of the slit disk 19, i.e., the rotating quantity of the focusing motor M2. The various lens groups 1–4 described above constitute the photographic lens optical system.

Figure 3:
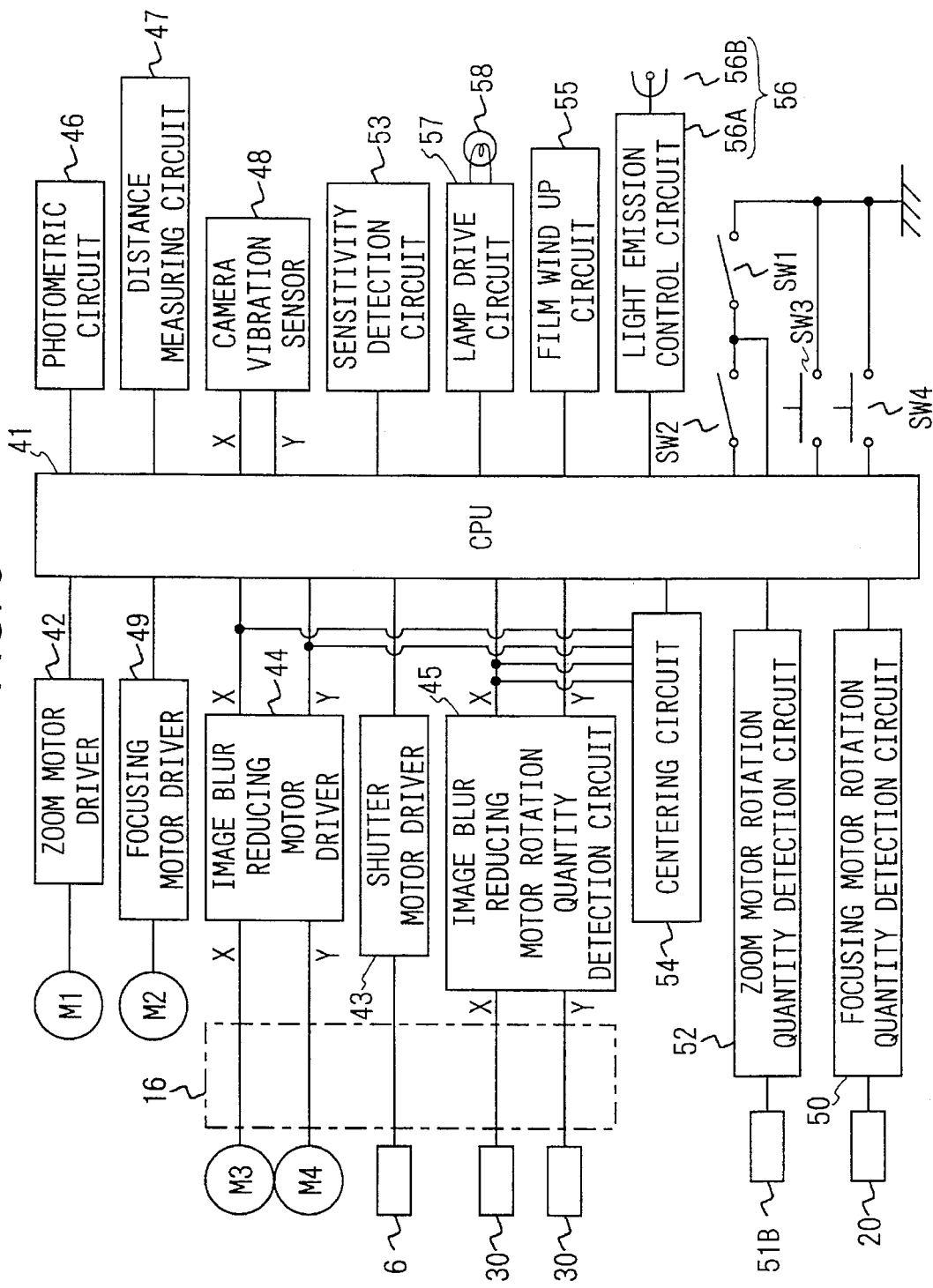
FIG. 3 is a block diagram showing the structure of the control system of the camera described above.

FIG. 3 shows the structure of the control system of the camera described above.

The zoom motor M1 and the focusing motor M2 described above are both connected to the CPU 41 via the zoom motor driver 42 and the focusing motor driver 49 respectively. The Y-direction motor M3 and the X-direction motor M4, which constitute the drive mechanism for the image blur reducing device 100, are both connected to the image blur reducing motor driver 44 via the flexible printed circuit board (hereafter referred to as FPC) 16 shown in FIG. 1. The drive unit 6 of the lens shutter mechanism is connected to the shutter motor drive 43 via the FPC 16. The motor drivers 43, 44 are both connected to the CPU 41.

The outputs from the X-direction and Y-direction photo-interrupters 30 are input to the CPU 41 via the FPC 16 and the image blur reducing motor rotating quantity detection circuit 45. The outputs from the photo interrupters 51B, 20 are both input to the CPU 41 via the zoom motor rotating quantity detection circuit 52 and the focusing motor rotating quantity detection circuit 50. The CPU 41 recognizes the shift position of the image blur reducing lens 3, the drive position of the focusing lens 4 and the focal length of the photographic lens based upon the outputs from the detection circuits 45, 52 and 50 respectively.

Also connected to the CPU 41 are a photometric circuit 46, which detects the brightness of the photographic subject, a distance measuring circuit 47, which detects the distance to the photographic subject, a camera vibration sensor 48, which may be an angular velocity sensor that detects the quantity of camera vibration in the X-direction and in Y-direction, a sensitivity detection circuit 53 that detects the ISO sensitivity of the film, a centering circuit 54 for driving the image blur reducing lens 3 to the central position (the position where the optical axis of the image blur reducing lens 3 aligns with the optical axis of the photographic lens), a film wind-up circuit 55, a light emission control circuit 56A of the electronic flash device 56 and a drive circuit 57 for the red eye reducing lamp 58. The centering circuit 54 drives and controls the image blur reducing lens 3 in such a manner that the outputs from the X-direction and Y-direction photo interrupters 30 shown in FIG. 2 will be at a reference value which is preset. By doing so, it drives the image blur reducing lens 3 to the central position described above.

With the camera in this embodiment, pre-light emission is performed by the red eye reducing lamp 58 prior to flash photographing in order to reduce the level of the so-called red eye phenomenon. Then flash photography is performed with main light emission of the flash unit 56B of the electronic flash device 56.

In addition, a first position switch SW1 that is turned ON when the release button (not shown) is pressed half way down, a second position switch SW2 that is turned ON when the release button is pressed all the way down and a zoom up switch SW3 and a zoom down switch SW4 for zooming the photographic lens are connected to the CPU 41.

When the zoom up switch SW3 or the zoom down switch SW4 is turned ON, the CPU 41 outputs a drive signal to the zoom motor M1 via the zoom motor driver 42. This results in the motor M1 rotating in a specific direction. This then causes the cam cylinder 13 to rotate via the gears 23, 22 and 15a and the cam grooves 13a, 13b, 13c to move. As the cam grooves 13a, 13b, 13c move, the cam followers 5a, 7c, 10a are driven in the direction of the optical axis along the rectilinear grooves 14a, 14b. As a result, the lens holder 5, which holds the lens group 1, the base that holds the lens groups 2, 3 and the lens base 10 that holds the lens group 4 are driven in the direction of the optical axis to perform zooming (either zoom up or zoom down).

(1) First embodiment

Figure 4A:
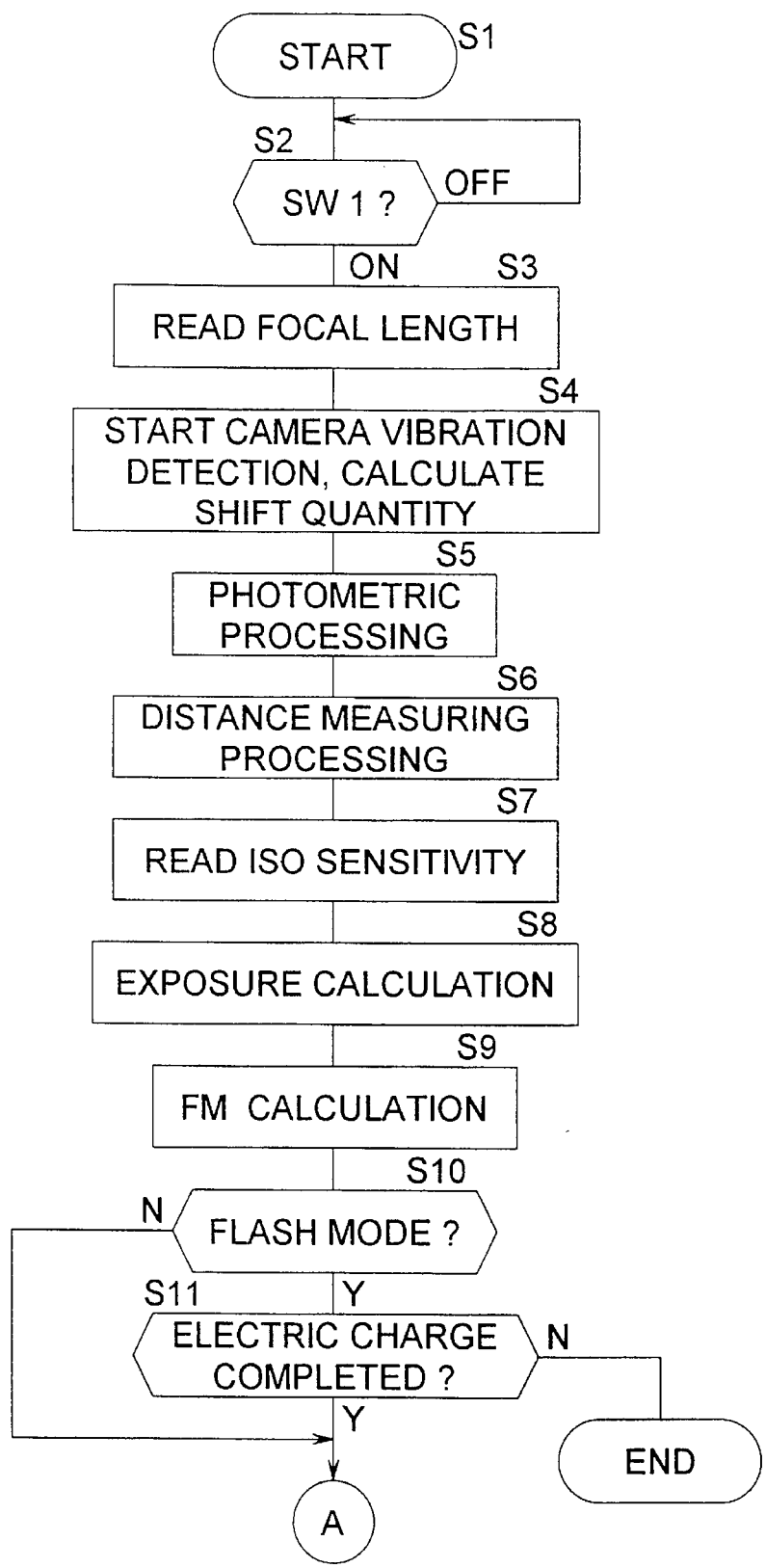
FIGS. 4A—4C are a flow chart showing the photographing procedure in the first embodiment.
Figure 4B:
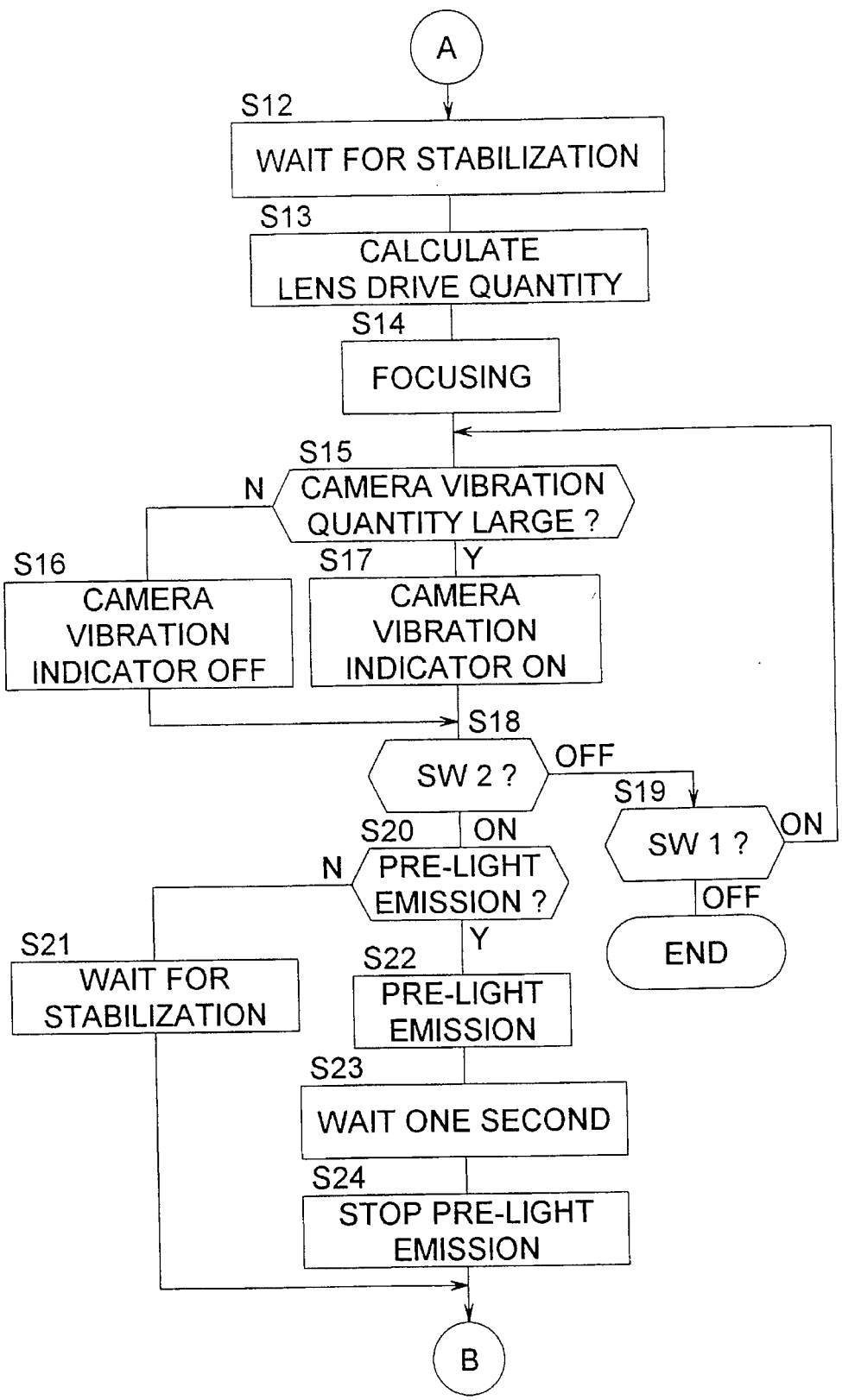
Figure 4C:
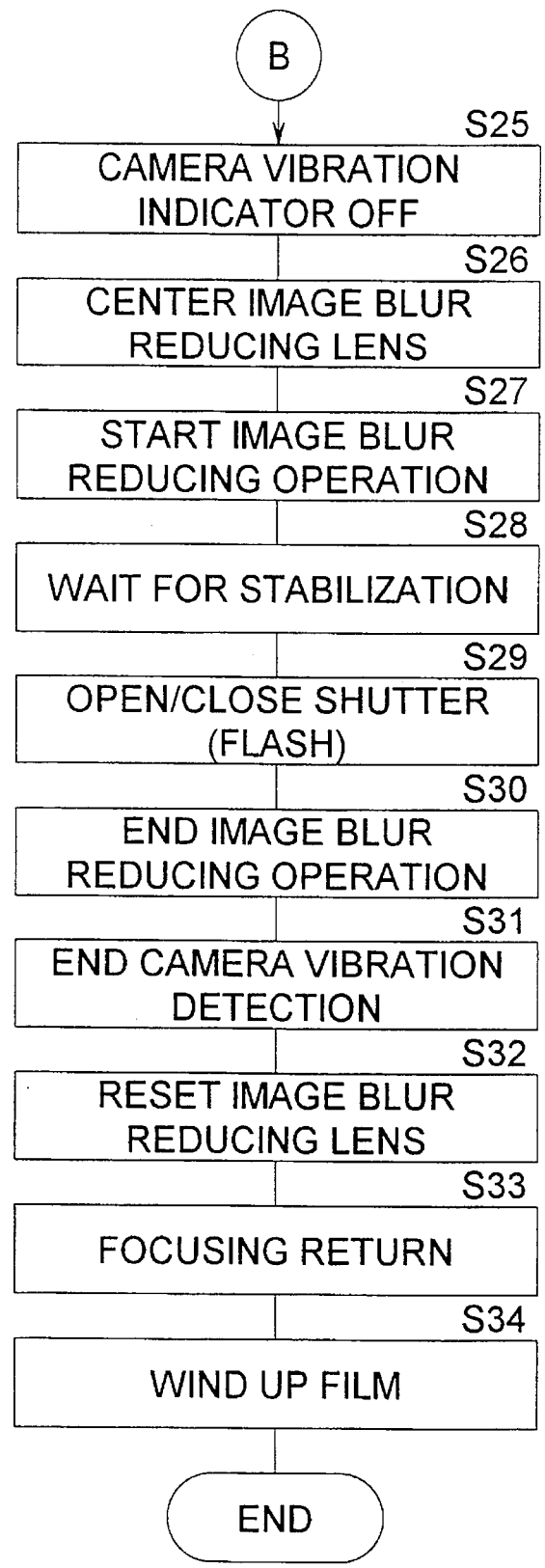

The procedure with which photographing control is performed by the CPU 41 in the first embodiment is explained in reference to the flow chart in FIGS. 4A–4C.

The program starts at step S1 and then the operation waits for the first position switch SW1 to be turned ON in step S2. When the first position switch SW1 is turned ON, the operation proceeds to step S3, in which the output of the zoom motor rotating quantity detection circuit 52 is read. With this, the current focal length of the photographic lens is recognized. In step S4, camera vibration detection by the camera vibration sensor 48 starts and, based upon the results of that detection and also the focal length of the photographic lens, the shift quantity for the image blur reducing lens 3, which is required to prevent image blur, is calculated. In step S5, the photometric circuit 46 is operated and its detection output, i.e., the brightness of the photographic subject, is input. In step S6, the distance measuring circuit 47 is operated and its detection output, i.e., the distance to the photographic subject, is input.

In step S7, the sensitivity detection circuit 53 is operated and its detection output, i.e., the film ISO sensitivity, is input. In step S8, the exposure calculation, the technology of which is of the known art, is performed based upon the input photographic subject brightness and the ISO sensitivity, to determine the exposure value required to achieve correct exposure. In step S9, the flashmatic calculation (FM calculation) is performed based upon the input photographic subject distance, the ISO sensitivity and the guide number of the electronic flash device 56, to determine the correct aperture value for flash photographing.

In step S10, decision making for the flash mode is performed based upon the photographic subject brightness. If the photographic subject brightness is equal to or more than a specific value, a decision is made that the flash mode is not ON and the operation proceeds to step S12. If, on the other hand, the photographic subject brightness is not equal to or more than a specific value, a decision is made that the flash mode is ON, and the operation proceeds to step S11. In step S11, a decision is made as to whether or not electric charging of the electronic flash device has been completed. If charging has not been completed, the processing ends there. If charging has been completed, the operation proceeds to step S12.

In step S12, the operation waits for the detection signal of the camera vibration sensor 48 to stabilize. Then, in step S13, the lens drive quantity required for focusing is calculated based upon the photographic subject distance. In step S14, the focusing motor M2 is driven via the focusing motor driver 49 in order to drive the focusing lens 4 over the distance calculated for the lens drive quantity. With the rotation of the motor M2, the lens holder 11 is rotated via the gears 18, 11a and with this, the lens holder 11 is also driven in the direction of the optical axis due to the effect of the helicoids 10b, 11b. In short, the focusing lens 4 moves in the direction of the optical axis while rotating, to perform focusing. The photo interrupter 20 detects the information related to the distance moved by the focusing lens 4, which is then input to the CPU 41 via the focusing lens travel distance detection circuit 50.

In step S15, a decision is made as to whether or not the camera vibration quantity detected by the camera vibration sensor 48 is equal to or more than a specific quantity. If the camera vibration quantity is equal to or more than the specific quantity, an indicator element (not shown) for camera vibration warning is lit in step S17. If the camera vibration quantity is less than the specific quantity, the aforementioned indicator element is turned OFF in step S16. Then, in step S18, a decision is made as to whether the release switch SW2 is ON or OFF. If it is OFF, then, in step S19, a decision is made as to whether the first position switch SW1 is ON or OFF. If the first position switch SW1 is OFF, the processing ends there. If it is ON, the operation returns to step S15.

If it is decided in step S18 that the release switch SW2 is ON, the operation proceeds to step S20 in which a decision is made as to whether or not pre-light emission for red eye reduction is to be performed. If it has been decided in step S10 that the flash mode is ON, it is decided that pre-light emission is to be performed and the operation proceeds to step S22. In step S22, pre-light emission of the red eye reducing lamp 58 is started via the lamp drive circuit 57. In step S23, the operation allows one second to elapse before it proceeds to step S24, in which the pre-light emission is stopped. If, on the other hand, it has been decided that the flash mode is not ON, then it is decided that pre-light emission is not to be performed. In that case, the operation proceeds to step S21, in which a specific length of time is allowed to elapse before the operation proceeds to step S25.

In step S25, the indicator element for camera vibration warning is turned OFF and in step S26, the image blur reducing lens 3 is driven to the central position (the position where the optical axis of the lens 3 is aligned with the optical axis of the photographic lens) by operating the centering circuit 54. In step S27, the image blur reducing operation is started. In other words, the Y-direction motor M3, and the X-direction motor M4 are driven via the image blur reducing motor driver 44 and the image blur reducing lens 3 is shifted over the distance that has been calculated as the shift quantity in the image blur calculation described above, in a direction perpendicular to the optical axis of the photographic lens. In step S28, the operation allows a specific length of time to elapse until the travel-speed of the image blur reducing lens 3 stabilizes. After that, in step S29, shutter 12 is opened and closed via the shutter motor driver 43. If it has been decided that the flash mode is ON, the main light emission of the electronic flash device 56 is performed in synchronization with the driving of the shutter 12.

Then, in step S30, the image blur reducing operation is finished by stopping the Y-direction motor M3 and X-direction motor M4. In step S31, the camera vibration detection performed by the camera vibration sensor 48 is finished. In step S32, the image blur reducing lens 3 is driven to a specific reset position and in step S33, the focusing lens 4 is returned to the reset position. In step S34, the film is wound up by one frame via the film wind up circuit 55 and with this, the processing ends.

In the procedure shown in FIGS. 4A–4C explained so far, when the release button is pressed half way down, camera vibration detection by the camera vibration sensor 48 and the image blur calculation based upon the results of the camera vibration detection start. Then, if flash photographing condition is present, by pressing the release button all the way down after pressing it half way down, pre-light emission of the red eye reducing lamp 58 is started. After one second has elapsed, the pre-light emission is stopped and the image blur reducing operation, i.e., the driving of the image blur reducing lens 3 based upon the results of the aforementioned camera vibration detection is started, and then flash photographing is performed.

As has been explained, in this embodiment, since the image blur reducing operation starts after pre-light emission stops, the image blur reducing operation and pre-light emission are never performed simultaneously. As a result, fluctuation in the voltage supplied to the Y-direction and X-direction motors M3, M4 caused by the elevated current generated during pre-light emission is prevented and the image blur reducing lens 3 can be driven accurately.

Now, when the photographer presses the release button all the way down, the camera normally experiences vibration due to the force with which the release button is pressed. If this camera vibration quantity is large, image blur may not be prevented even if an image blur reducing operation is performed. However, in this embodiment, pre-light emission is performed after the release button is pressed all the way down. Then the operation allows enough time to elapse until the travel speed of the image blur reducing lens 3 stabilizes, after the start of the image blur reducing operation and only then is flash photographing performed. Because of this, camera vibration caused by pressing the release button all the way down is attenuated during this time span after the release button is pressed all the way down and before flash photographing occurs. Thus, flash photographing is performed in this vibration damped state and this provides a sufficient image blur reducing effect for flash photographing.

Also, since the operation allows a specific length of time to elapse after the release button is pressed all the way down until the image blur reducing operation starts, even during normal photographing, which does not use the electronic flash device 56, the image blur reducing operation is performed after the camera vibration caused by the release button pressed all the way down just in the same way as described above becomes damped, providing a satisfactory degree of image blur reduction.

(2) Second embodiment

Figure 5A:
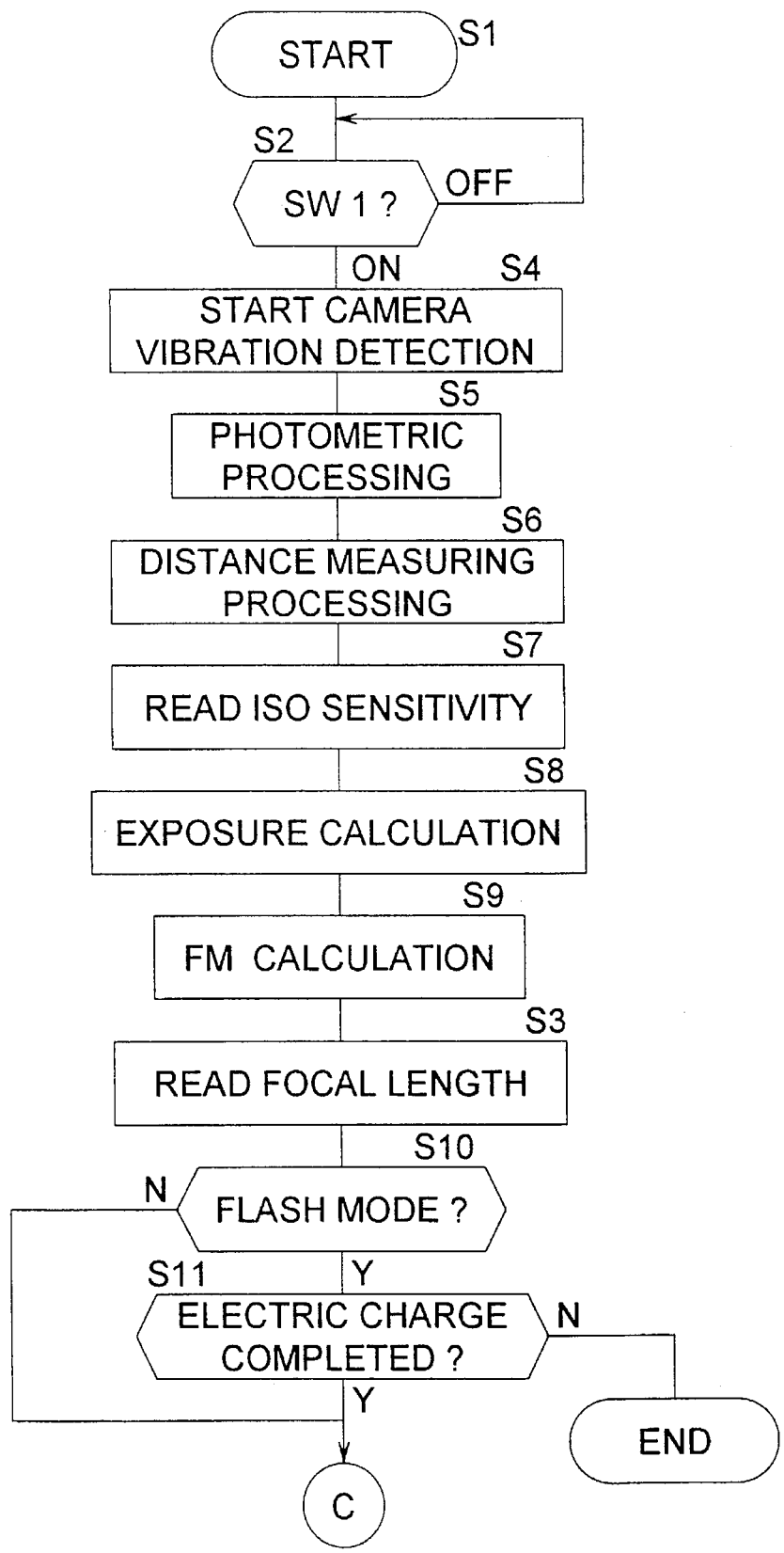
FIGS. 5A–5C are a flow chart showing the photographing procedure in the second embodiment.
Figure 5B:
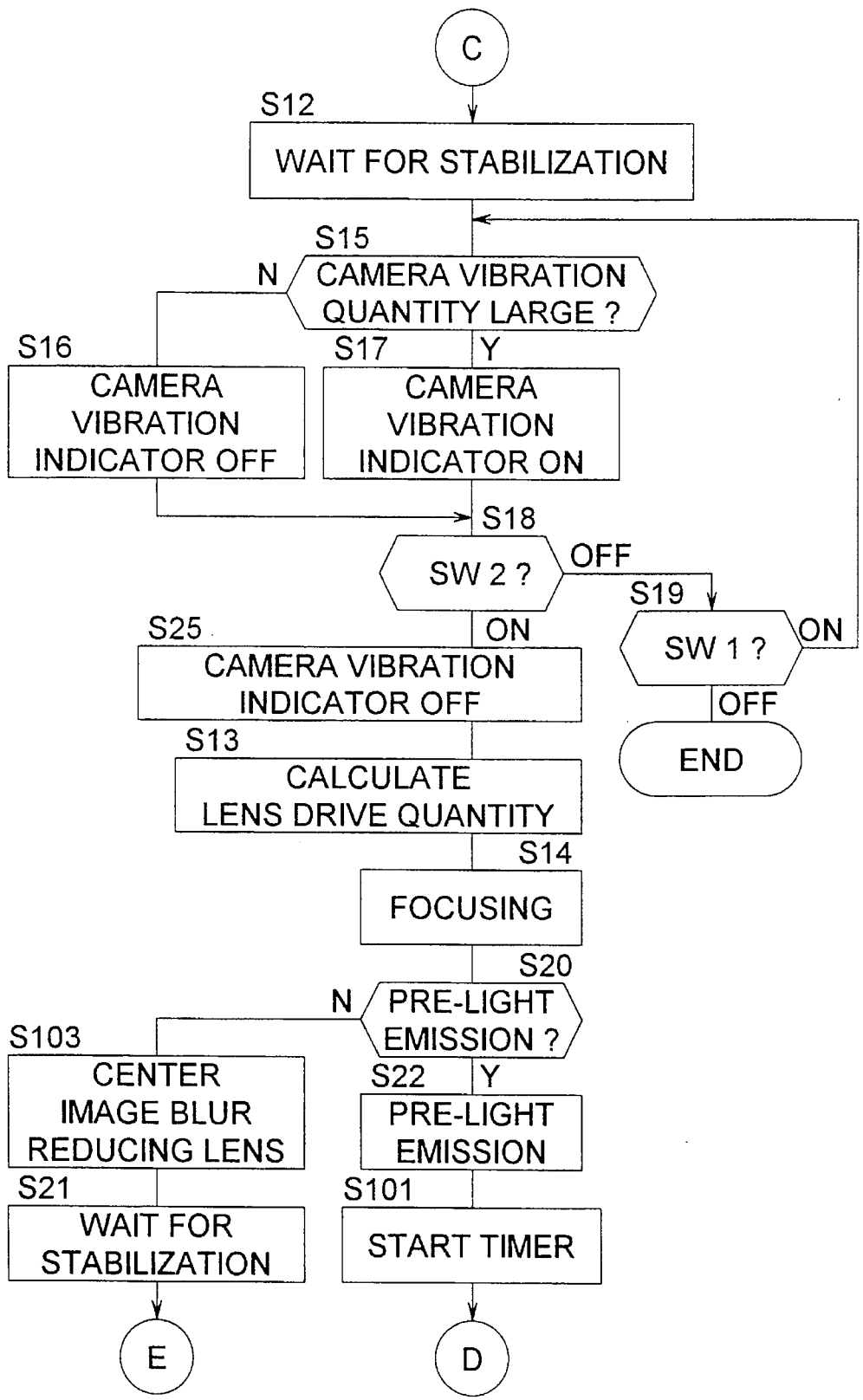
Figure 5C:
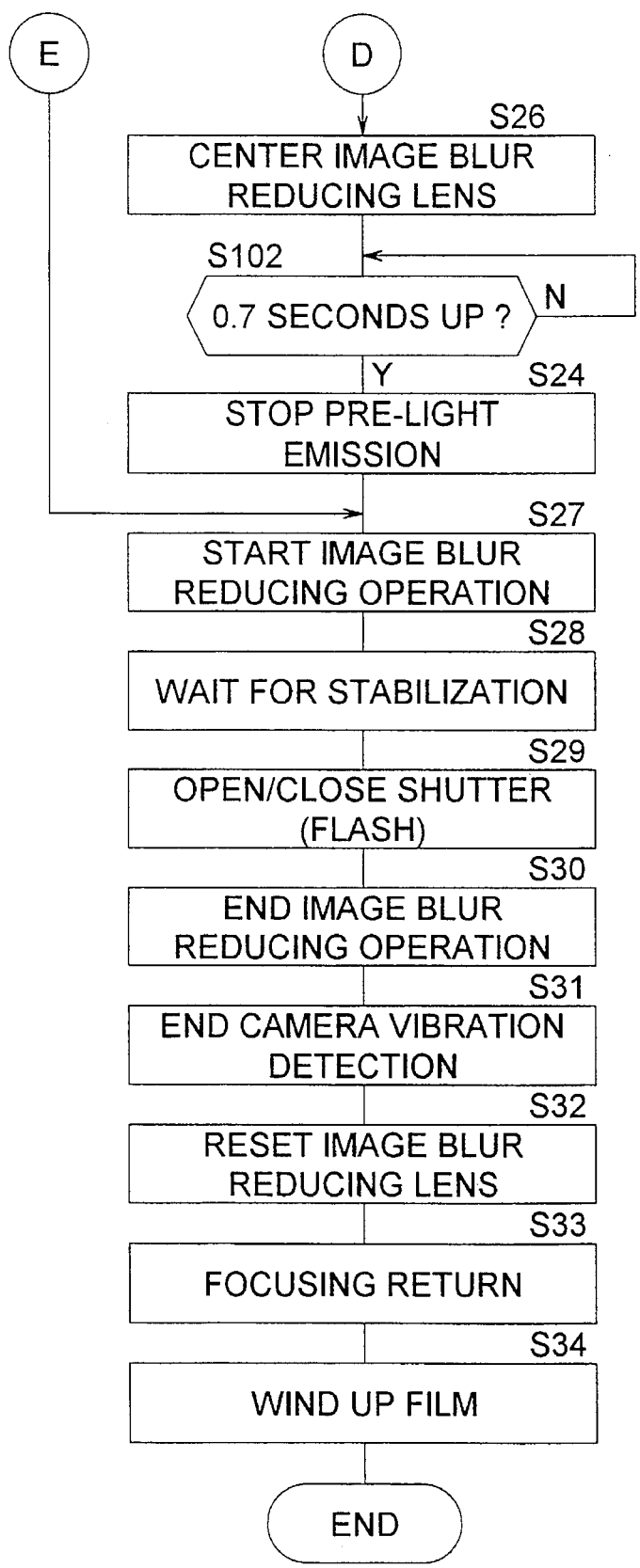

The procedure with which photographing control is performed by the CPU 41 in the second embodiment is explained in reference to the flow chart in FIGS. 5A–5C. Note that the same step numbers are assigned to steps that are identical to those in FIGS. 4A–4C and here, mainly the differences are explained.

The program starts at step S1 and if it is decided in step S2 that the first position switch SW1 is ON, the processing described above in steps S4–S9 is performed. After that, in step S3, the focal length of the photographic lens is read. After executing the processing in steps S10–S12, the processing in steps S15–S19 is performed. Then, in step S25, the indicator element for image blur warning due to camera vibration is turned OFF. In step S13, the lens drive quantity is calculated and in step S14, focusing is performed.

In step S20, a decision is made as to whether or not pre-light emission for red eye reduction is to be performed. If pre-light emission is to be performed, the operation proceeds to step S22, in which pre-light emission of the red eye reducing lamp 58 is started. In step S101, the timer for counting red eye reduction standby time is started. In step S26, the image blur reducing lens 3 is driven to the central position described above. In step S102, the operation allows 0.7 seconds to elapse after the timer starts. Then, in step S24, pre-light emission is stopped before the operation proceeds to step S27. Processing identical to that described above is performed in steps S27–S34.

In contrast, if pre-light emission is not to be performed, the operation proceeds directly to step S103 from step S20. In step S103, the correction lens 3 is driven to the central position. Then in step S21, the operation allows a specific length of standby time to elapse before proceeding to step S27.

Figure 6:
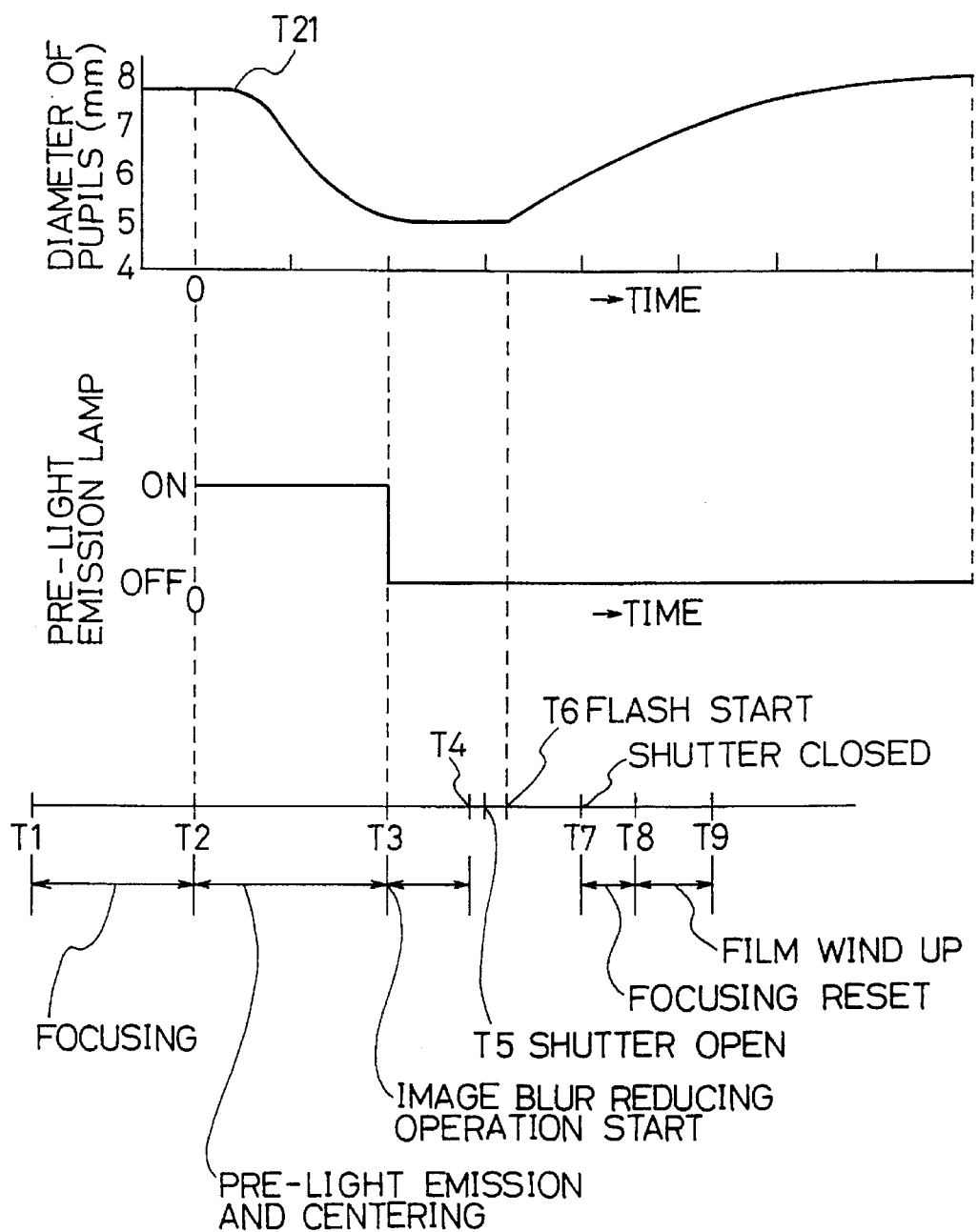
FIG. 6 illustrates the operation in the second embodiment.

The camera operation corresponding with the procedure explained in reference to FIGS. 5A–5C so far, is now explained in reference to FIG. 6.

FIG. 6 shows the timing with which various camera operations are performed during flash photographing and the change in the diameter of the pupils of the photographic subject over time. When flash photographing conditions are present, camera vibration detection by the camera vibration sensor 48 starts when the release button is pressed half way down. Then, if the release button is pressed all the way down at the time point T1, focusing is performed and at the time point T2 after the focusing is completed, pre-light emission with lamp 58 for red eye reduction starts. The pupils of the photographic subject start to contract gradually, beginning at the time point T21 after the pre-light emission starts and they continue to contract even after the 0.7-second pre-light emission ends.

After the pre-light emission starts, the image blur reducing lens 3 starts to be driven to the central position. This centering is completed before the pre-light emission stops. When the centering is completed, the pre-light emission stops at the time point T3 at which 0.7 seconds have elapsed since the start of the pre-light emission. At the same time, the image blur reducing operation starts. After that, the operation allows a specific length of standby time to elapse until the time point T4. Then at the time point T5, the shutter is opened. At the time point T6, main light emission of the electronic flash device 56 is performed and at the time point T7, the shutter is closed. Then, the focusing lens is returned to the reset position between the time point T7 and the time point T8 and the film is wound up by 1 frame between the time point T8 and the time point T9.

In this embodiment too, since the image blur reducing operation starts after pre-light emission stops, the image blur reducing operation and pre-light emission are never performed simultaneously. As a result, fluctuation in the voltage supplied to the Y-direction and X-direction motors M3, M4 caused by an elevated current generated during the pre-light emission is prevented and the image blur reducing lens 3 can be driven accurately.

Also, since flash photographing is performed with the pupils of the photographic subject in their most contracted state, after pre-light emission stops, the red eye reducing effect is enhanced to its maximum potential. Furthermore, since the image blur reducing lens 3 is driven to its initial position while the pre-light emission is in progress, the pre-light emission time can be utilized efficiently. In other words, compared to the situation in which the lens 3 is driven to its initial position either before or after the pre-light emission, the time elapsing after the release button is pressed all the way down until flash photographing is performed can be reduced.

In addition, in this embodiment, focusing and pre-light emission are performed sequentially after the release button is pressed all the way down. Then the operation allows a specific length of time until the travel speed of the image blur reducing lens 3 stabilizes after the start of the image blur reducing operation before performing flash photographing. As a result, camera vibration caused by pressing the release button all the way down is damped during the time elapsing between pressing the release button all the way down and flash photographing. This means flash photographing can be performed in the vibration damped state and with this, a sufficient degree of image blur reducing effect can be obtained during flash photographing.

Note that it is acceptable to performing the focusing during the pre-light emission is performed.

(3) Third embodiment

Figure 7A:
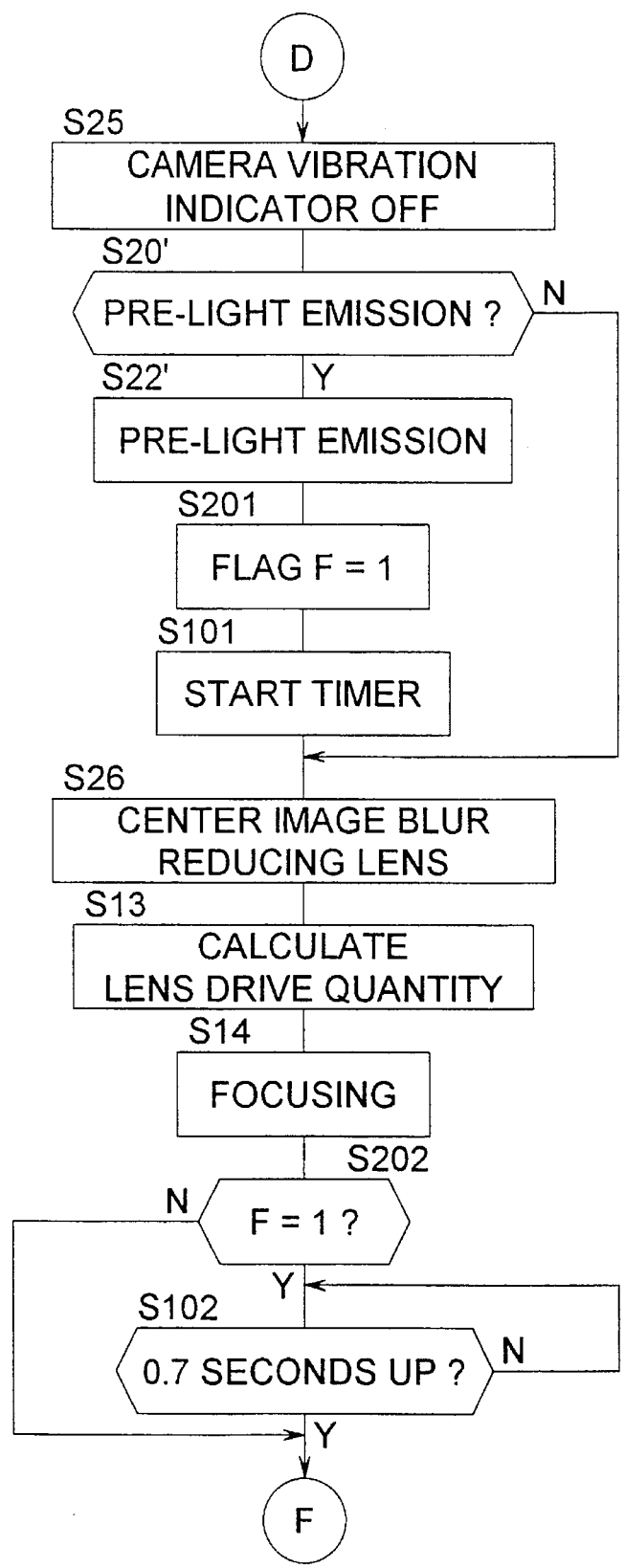

The procedure with which photographing control is performed by the CPU 41 in the third embodiment is explained in reference to the flow chart in FIGS. 7A and 7B. The processing performed in step S1–S19 is exactly the same as that explained in reference to FIGS. 5A and 5B for the second embodiment and so its illustrations and explanation are omitted. Note that in FIGS. 7A and 7B, the same step numbers are assigned to the steps that are identical to those in FIGS. 5B and 5C and here, the differences are explained.

If a decision is made in step S19 that the release switch SW2 is ON, the indicator element for camera vibration warning is turned OFF in step S25 in FIG. 7A. If it is decided in step S20' that pre-light emission is to be performed, pre-light emission of the red eye reducing lamp 58 is performed in step S22'. Unlike the pre-light emission in the first and second embodiments, the pre-light emission in this embodiment is a very short pulse light emission. The intensity of the light emission in this embodiment is set higher compared with that in the first and second embodiments. Then in step S201, the flag F is set to 1. After starting the timer in step S101, the operation proceeds to step S26 in which the centering circuit 54 is operated to drive the correction lens 3 to the central position After performing lens drive quantity calculation (step S13) and focusing (step S14), a decision is made as to whether or not the flag F is set to 1 in step S202. If the flag F is not set to 1, the operation proceeds to step S27. If it is set to 1, the operation proceeds to step S102 in which the operation allows 0.7 seconds to elapse after the pre-light emission i.e., the operation allows the count time on the timer to reach 0.7 seconds before proceeding to step S27. After that, the processing in step S27–S34 is performed sequentially.

Figure 8:
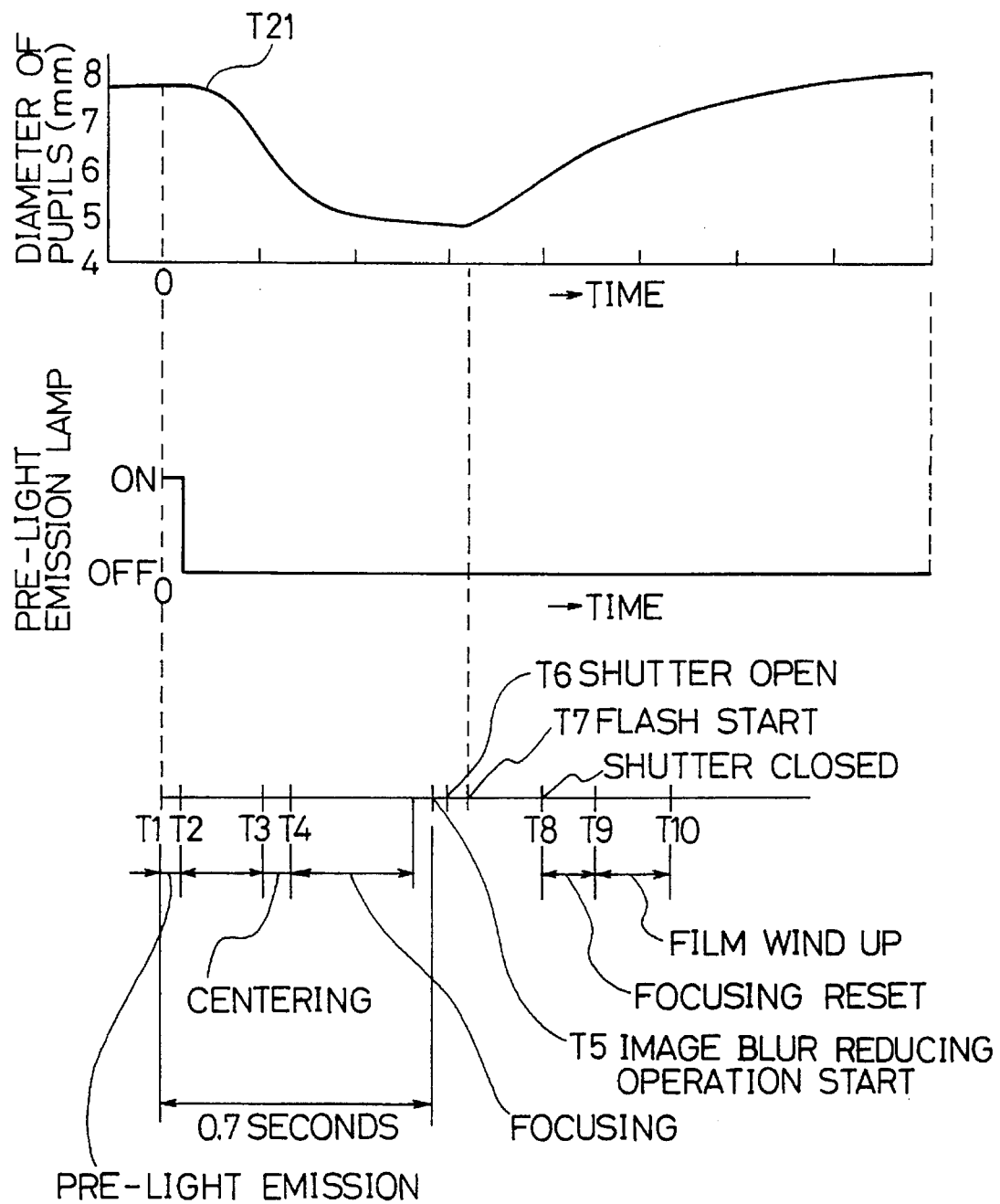
FIG. 8 illustrates the operation in the third embodiment.

The camera operation that corresponds with the procedure explained in reference to FIGS. 7A and 7B above, is now explained in reference to FIG. 8.

FIG. 8 shows the timing with which various camera operations are performed during flash photographing and the change in the diameter of the pupils of the photographic subject over time. When flash photographing conditions are present, if the release button is pressed half way down, camera vibration detection by the camera vibration sensor 48 starts in response. Then, if the release button is pressed all the way down at the time point T1, pre-light emission with the lamp 58 for red eye reduction is performed until the time point T2. The pupils of the photographic subject start to contract gradually at the time point T21 after the pre-light emission. After that, the image blur reducing lens 3 is driven to the central position between the time points T3 and T4, to carry out focusing. The image blur reducing operation starts at the time point T5 at which time, 0.7 seconds have elapsed since the pre-light emission (at this point, focusing has been completed). The shutter is opened at the time point T6, the main light emission of the electronic flash device 56 is performed at the time point T7, and at the time point T8, the shutter is closed. Then, the focusing lens is returned to the reset position between the time point T8 and the time point T9 and the film is wound up by 1 frame between the time point T9 and the time point T10.

In this embodiment too, since the image blur reducing operation starts after pre-light emission stops, the image blur reducing operation and pre-light emission are never performed simultaneously. As a result, fluctuation in the voltage supplied to the Y-direction and X-direction motors M3, M4 caused by an elevated current generated during pre-light emission is prevented and the image blur reducing lens 3 can be driven accurately.

Also, since, after pre-light emission, flash photographing is performed with the pupils of the photographic subject in their most contracted state, a sufficient red eye reducing effect is achieved. Furthermore, since the image blur reducing lens 3 is driven to its initial position and also focusing is performed during the 0.7 seconds after the pre-flash, the red eyes reduction standby time can be utilized efficiently and the time that elapses after the release button is pressed all the way down until the time of flash photographing is minimized.

In addition, flash photographing is performed only when 0.7 seconds standby time has elapsed after the pre-flash which follows the release button being pressed all the way down, and only when a specific length of time has elapsed after the start of the image blur reducing operation, and camera vibration caused by pressing the release button all the way down is damped between the time when the release button pressed and the time of flash photographing. Thus, photographing is performed in the damped state, providing a satisfactory degree of image blur reducing effect for flash photographing.

Note that in the third embodiment, the order in which the centering of the image blur reducing lens and the focusing are performed may be the reverse of that given above. The structure of the image blur reducing device is not limited to that shown in FIG. 2, either. Furthermore, the position of the image blur reducing lens 3 is not limited to that in the embodiments described above. While the lamp 58 is used as the means for pre-light emission, the electronic flash device may function as the means. Additionally, the embodiments presented above are examples in which pre-light emission is started by turning ON the release switch SW2. However, pre-light emission may be started by turning ON the first position switch SW1.

We claim:

1. A camera capable of reducing image blur comprising;
   a vibration detection device that detects a quantity of camera vibration,
   an image blur reducing device that, based upon a detection output from said vibration detection device, electrically drives an image blur reducing optical system in a direction that is different from a direction of an optical axis of a photographic lens in order to reduce blurring of a photographic image,
   a flash photographing device that, when a flash photographing condition is present, performs photographing with emitting an illuminating light to illuminate a photographic subject,
   a pre-light emission device that performs pre-light emission prior to flash photographing in order to reduce a red eye phenomenon, and
   a control device that, when said flash photographing condition is present, causes said image blur reducing device and said flash photographing device to operate after said pre-light emission by said pre-light emission device is completed.

2. A camera capable of reducing image blur according to claim 1, further comprising;
   a signal output device that outputs a signal that instructs a photographing preparation and also a signal that instructs a start of photographing wherein;
   when said flash photographing condition is present, said control device starts a detection of camera vibration quantity with said vibration detection device in response to an output of said signal for instructing a photographing preparation, causes said pre-light emission device to operate when said signal for instructing a start of photographing is output after said signal for instructing a photographing preparation is output, starts an operation of said image blur reducing device and causes said flash photographing device to operate after said pre-light emission device stops operating, and stops said operation of said image blur reducing device after an operation of said flash photographing device ends.

3. A camera capable of reducing image blur according to claim 2, further comprising;
   a focusing device which drives said photographic lens to a focusing position wherein;
   said control device causes said focusing device to operate in response to the output of said signal for instructing a photographing preparation.

4. A camera capable of reducing image blur according to claim 1, wherein;
   when said flash photographing condition is present, said control device starts said pre-light emission by said pre-light emission device with specific timing, stops said pre-light emission after a specific length of time has elapsed following the start of said pre-light emission and causes said image blur reducing device and said flash photographing device to operate after said pre-light emission stops.

5. A camera capable of reducing image blur according to claim 4, wherein;
   said specific length of time is a length of time required for pupils of a photographic subject who is looking at said pre-light emission to contract to a degree whereby said red eye phenomenon is reduced to a negligible level.

6. A camera capable of reducing image blur according to claim 1, wherein;
   when said flash photographing condition is present, said control device performs said pre-light emission with specific timing using said pre-light emission device for an extremely short length of time and causes said image blur reducing device and said flash photographing device to operate when a specific length of time has elapsed following said pre-light emission.

7. A camera capable of reducing image blur according to claim 6, wherein;
   said specific length of time is a length of time required for pupils of a photographic subject who is looking at said pre-light emission to contract to a degree whereby said red eye phenomenon is reduced to a negligible level.

8. A camera capable of reducing image blur according to claim 1, wherein;
   said image blur reducing optical system constitutes a part of said photographic lens and the direction in which said image blur reducing optical system is driven is a direction perpendicular to said optical axis of said photographic lens.

9. A camera capable of reducing image blur comprising;
   a vibration detection device that detects a quantity of camera vibration,
   an image blur reducing device that, based upon a detection output from said vibration detection device, electrically drives an image blur reducing optical system in a direction that is different from a direction of an optical axis of a photographic lens in order to reduce blurring of a photographic image,
   a flash photographing device that, when a flash photographing condition is present, performs photographing with emitting an illuminating light to illuminate a photographic subject,
   a pre-light emission device that performs pre-light emission prior to flash photographing in order to reduce a red eye phenomenon, and
   a control device that, when said flash photographing condition is present, causes said image blur reducing device to operate after said pre-light emission by said pre-light emission device starts in order to drive said image blur reducing optical system to an initial position thereof, stops said pre-light emission when a specific length of time has elapsed following the start of said pre-light emission after said image blur reducing optical system is driven to said initial position, and after said pre-light emission stops, starts an operation of said image blur reducing device in order to drive said image blur reducing optical system in the direction different from the direction of said optical axis based upon the detection output of said vibration detection device and causes said flash photographing device to operate.

10. A camera capable of reducing image blur according to claim 9, wherein;
    said control device stops said operation of said image blur reducing device after an operation of said flash photographing device ends.

11. A camera capable of reducing image blur according to claim 9, further comprising;
a signal output device that outputs a signal that instructs a photographing preparation and also a signal for instructing a start of photographing wherein;
when said flash photographing condition is present, said control device starts a detection of camera vibration quantity with said vibration detection device in response to an output of said signal for instructing a photographing preparation and performs said pre-light emission with said pre-light emission device when said signal for instructing a start of photographing is output after said signal for instructing a photographing preparation is output.

12. A camera capable of reducing image blur according to claim 11 wherein;
said control device stops operations of said image blur reducing device and said vibration detection device after an operation of said flash photographing device stops.

13. A camera capable of reducing image blur according to claim 11, further comprising;
a focusing device which drives said photographic lens to a focusing position wherein;
when said flash photographing condition is present, said control device causes said focusing device to operate in response to an output of said signal for instructing a start of photographing and performs said pre-light emission with said pre-light emission device after an operation of said focusing device ends.

14. A camera capable of reducing image blur according to claim 9, wherein;
said specific length of time is a length of time required for pupils of a photographic subject who is looking at said pre-light emission to contract to a degree whereby said red eye phenomenon is reduced to a negligible level.

15. A camera capable of reducing image blur according to claim 9, wherein;
said image blur reducing optical system constitutes a part of said photographic lens and said direction in which said image blur reducing optical system is driven is a direction perpendicular to said optical axis of said photographic lens.

16. A camera capable of reducing image blur according to claim 15, wherein;
said initial position of said image blur reducing optical system is a position at which an optical axis of said image blur reducing optical system aligns with said optical axis of said photographic lens.

17. A camera capable of reducing image blur comprising;
a vibration detection device that detects the quantity of camera vibration,
an image blur reducing device that, based upon a detection output from said vibration detection device, electrically drives an image blur reducing optical system in a direction that is different from a direction of an optical axis of a photographic lens in order to reduce blurring of a photographic image,
a flash photographing device that, when a flash photographing condition is present, performs photographing with emitting an illuminating light to illuminate a photographic subject,
a pre-light emission device that performs pre-light emission for an extremely short length of time prior to flash photographing in order to reduce a red eye phenomenon, and
a control device that, when said flash photographing condition is present, causes said image blur reducing device to operate in order to drive said image blur optical system to an initial position thereof after said pre-light emission is performed by said pre-light emission device, and after said image blur reducing optical system is driven to said initial position and when a specific length of time has elapsed following said pre-light emission, starts an operation of said image blur reducing device in order to drive said image blur reducing optical system in said direction that is different from the direction of said optical axis based upon said detection output from said vibration detection device and causes said flash photographing device to operate.

18. A camera capable of reducing image blur according to claim 17, wherein;
said control device stops said operation of said image blur reducing device after an operation of said flash photographing device ends.

19. A camera capable of reducing image blur according to claim 17, further comprising;
a signal output device that outputs a signal that instructs a photographing preparation and also a signal for instructing a start of photographing wherein;
when said flash photographing condition is present, said control device starts a detection of camera vibration quantity with said vibration detection device in response to an output of said signal for instructing a photographing preparation and performs said pre-light emission with said pre-light emission device when said signal for instructing a start of photographing is output after said signal for instructing a photographing preparation is output.

20. A camera capable of reducing image blur according to claim 17, wherein;
said control device stops operations of said image blur reducing device and said vibration detection device after an operation of said flash photographing device ends.

21. A camera capable of reducing image blur according to claim 17, wherein;
said specific length of time is a length of time required for pupils of a photographic subject who is looking at said pre-light emission to contract to a degree whereby said red eye phenomenon is reduced to a negligible level.

22. A camera capable of reducing image blur according to claim 17, wherein;
said image blur reducing optical system constitutes a part of said photographic lens and said direction in which said image blur reducing optical system is driven is a direction perpendicular to said optical axis of said photographic lens.

23. A camera capable of reducing image blur according to claim 22, wherein;
said initial position of said image blur reducing optical system is a position at which an optical axis of said image blur reducing optical system aligns with said optical axis of said photographic lens.

24. A camera capable of reducing image blur according to claim 17, further comprising;
a focusing device which drives said photographic lens to a focusing position, wherein;
when said flash photographing condition is present, after said pre-light emission performed by said pre-light emission device, said control device causes said image blur reducing device to operate in order to drive said image blur reducing optical system to said initial position and also causes said focusing device to operate, and after said image blur reducing optical system has been driven to said initial position and said photographic lens has been driven to said focusing position, when said specific length of time has elapsed following said pre-light emission, said control device starts said operation of said image blur reducing device in order to drive said image blur reducing optical system in said direction different from the direction of said optical axis of said photographic lens, based upon said detection output from said vibration detection device and also causes said flash photographing device to operate.

25. A method for flash photographing, comprising the steps of:

performing, when a flash photographing condition is present, pre-light emission prior to said flash photographing in order to reduce a red eye phenomenon, driving an image blur reducing optical system in a direction different from a direction of an optical axis of a photographic lens in order to reduce blurring of a photographic image following said pre-light emission, and performing photographing with an illuminating light for illuminating a photographic subject generated in synchronization with a driving of said image blur reducing optical system.

26. A method for flash photographing comprising the steps of:

starting, when a flash photographing condition is present, pre-light emission prior to said flash photographing in order to reduce a red eye phenomenon, driving an image blur reducing optical system to an initial position thereof before a specific length of time has elapsed following a start of pre-light emission, stopping said pre-light emission at a time point when said specific length of time has elapsed following said start of pre-light emission, electrically driving said image blur reducing optical system in a direction different from a direction of an optical axis of a photographic lens after said pre-light emission stops in order to reduce blurring of a photographic image, and performing photographing with an illuminating light for illuminating a photographic subject generated in synchronization with a driving of said image blur reducing optical system.

27. A method for flash photographing comprising the steps of:

performing, when a flash photographing condition is present, pre-light emission for an extremely short length of time prior to said flash photographing in order to reduce a red eye phenomenon, driving an image blur reducing optical system to an initial position thereof before a specific length of time has elapsed following said pre-light emission, performing focusing of a photographic lens before a specific length of time has elapsed following said pre-light emission, electrically driving said image blur reducing optical system in a direction different from a direction of an optical axis of said photographic lens after a specific length of time has elapsed following said pre-light emission in order to reduce blurring of a photographic image, and performing photographing with an illuminating light for illuminating a photographic subject generated in synchronization with a driving of said image blur reducing optical system.

28. A camera capable of reducing image blur comprising;

a vibration detection device that detects a quantity of camera vibration, an image blur reducing device that, based upon a detection output from said vibration detection device, electrically drives an image blur reducing optical system in a direction that is different from a direction of an optical axis of a photographic lens in order to reduce blurring of a photographic image, a flash photographing device that, when a flash photographing condition is present, performs photographing with emitting an illuminating light to illuminate a photographic subject, a pre-light emission device that performs pre-light emission prior to flash photographing in order to reduce a red eye phenomenon, and a control device that, when said flash photographing condition is present, prevents operations of said image blur reducing device and said flash photographing device until said pre-light emission by said pre-light emission device is finished.

29. A photographing apparatus capable of reducing image blur comprising:

a vibration detection device that detects a vibration of said apparatus;

an image blur reducing device that, based upon a detection output from said vibration detection device, reduces blurring of a photographic image;

a flash photographing device that, when a flash photographing condition is present, performs photographing with emitting an illuminating light to illuminate a photographic subject;

a pre-light emission device that performs pre-light emission prior to flash photographing; and a control device that, when said flash photographing condition is present, causes said image blur reducing device and said flash photographing device to operate after said pre-light emission by said pre-light emission device is completed.

30. A photographing apparatus capable of reducing image blur comprising:

a vibration detection device that detects a vibration of said apparatus;

an image blur reducing device that, based upon a detection output from said vibration detection device, reduces blurring of a photographic image;

a flash photographing device that, when a flash photographing condition is present, performs photographing with emitting an illuminating light to illuminate a photographic subject;

a pre-light emission device that performs pre-light emission prior to flash photographing; and a control device that, when said flash photographing condition is present, drives said image blur reducing device to an initial position thereof after said pre-light emission by said pre-light emission device starts, stops said pre-light emission when a specific length of time has elapsed following the start of said pre-light emission after said image blur reducing device is driven to said initial position, and after said pre-light emission stops, starts an operation of said image blur reducing device based upon the detection output of said vibration detection device and causes said flash photographing device to operate.

31. A photographing apparatus capable of reducing image blur comprising:

a vibration detection device that detects a vibration of said apparatus;

an image blur reducing device that, based upon a detection output from said vibration detection device, reduces blurring of a photographic image;

a flash photographing device that, when a flash photographing condition is present, performs photographing with emitting an illuminating light to illuminate a photographic subject;

a pre-light emission device that performs pre-light emission for an extremely short length of time prior to flash photographing; and a control device that, when said flash photographing condition is present, drives said image blur reducing device to an initial position thereof after said pre-light emission is performed by said pre-light emission device, and after said image blur reducing device is driven to said initial position and when a specific length of time has elapsed following said pre-light emission, starts an operation of said image blur reducing device based upon said detection output from said vibration detection device and causes said flash photographing device to operate.

32. A method for flash photographing, comprising the steps of:

performing, when a flash photographing condition is present, pre-light emission prior to said flash photographing;

driving an image blur reducing device in order to reduce blurring of a photographic image following said pre-light emission; and performing photographing with an illuminating light for illuminating a photographic subject generated in synchronization with a driving of said image blur reducing device.

33. A method for flash photographing comprising the steps of:

starting, when a flash photographing condition is present, pre-light emission prior to said flash photographing;

driving an image blur reducing device to an initial position thereof before a specific length of time has elapsed following a start of pre-light emission;

stopping said pre-light emission at a time point when said specific length of time has elapsed following said start of pre-light emission;

driving said image blur reducing device after said pre-light emission stops in order to reduce blurring of a photographic image; and performing photographing with an illuminating light for illuminating a photographic subject generated in synchronization with a driving of said image blur reducing device.

34. A method for flash photographing comprising the steps of:

performing, when a flash photographing condition is present, pre-light emission for an extremely short length of time prior to said flash photographing;

driving an image blur reducing device to an initial position thereof before a specific length of time has elapsed following said pre-light emission;

performing focusing of a photographic lens before a specific length of time has elapsed following said pre-light emission;

driving said image blur reducing device after a specific length of time has elapsed following said pre-light emission in order to reduce blurring of a photographic image; and performing photographing with an illuminating light for illuminating a photographic subject generated in synchronization with a driving of said image blur reducing device.

35. A photographing apparatus capable of reducing image blur comprising:

a vibration detection device that detects a vibration of said apparatus;

an image blur reducing device that, based upon a detection output from said vibration detection device, reduces blurring of a photographic image;

a flash photographing device that, when a flash photographing condition is present, performs photographing with emitting an illuminating light to illuminate a photographic subject;

a pre-light emission device that performs pre-light emission prior to flash photographing; and a control device that, when said flash photographing condition is present, prevents operations of said image blur reducing device and said flash photographic device until said pre-light emission device is finished.

* * * * *